No. 859,473. PATENTED JULY 9, 1907.
J. F. WEBB, JR.
ELECTRIC SIGNALING SYSTEM AND SELECTIVE MECHANISM THEREFOR.
APPLICATION FILED AUG. 25, 1906.

WITNESSES:
F. C. Gibson.
John T. Schrott.

INVENTOR
Jean F. Webb Jr.
BY
Fred G. Dieterich
ATTORNEYS.

No. 859,473. PATENTED JULY 9, 1907.
J. F. WEBB, Jr.
ELECTRIC SIGNALING SYSTEM AND SELECTIVE MECHANISM THEREFOR.
APPLICATION FILED AUG. 25, 1906.

WITNESSES:
F. C. Gibson.
John T. Schrott.

INVENTOR
Jean F. Webb Jr.
BY
Fred G. Dieterich & Co
ATTORNEYS.

No. 859,473. PATENTED JULY 9, 1907.
J. F. WEBB, Jr.
ELECTRIC SIGNALING SYSTEM AND SELECTIVE MECHANISM THEREFOR.
APPLICATION FILED AUG. 25, 1906.

WITNESSES:

INVENTOR
Jean F. Webb Jr.
BY
Fred G. Dieterich
ATTORNEYS.

No. 859,473. PATENTED JULY 9, 1907.
J. F. WEBB, Jr.
ELECTRIC SIGNALING SYSTEM AND SELECTIVE MECHANISM THEREFOR.
APPLICATION FILED AUG. 25, 1906.
6 SHEETS—SHEET 4.

WITNESSES:
INVENTOR
Jean F. Webb Jr.
BY
ATTORNEYS.

No. 859,473. PATENTED JULY 9, 1907.
J. F. WEBB, JR.
ELECTRIC SIGNALING SYSTEM AND SELECTIVE MECHANISM THEREFOR.
APPLICATION FILED AUG. 25, 1906.

WITNESSES:

INVENTOR
Jean F. Webb.
BY
ATTORNEYS

UNITED STATES PATENT OFFICE.

JEAN F. WEBB, JR., OF CHICAGO, ILLINOIS, ASSIGNOR TO THE ELECTRIC SIGNAGRAPH AND SEMAPHORE CO., INCORPORATED.

ELECTRIC SIGNALING SYSTEM AND SELECTIVE MECHANISM THEREFOR.

No. 859,473.  Specification of Letters Patent.  Patented July 9, 1907.

Application filed August 25, 1906. Serial No. 332,017.

*To all whom it may concern:*

Be it known that I, JEAN F. WEBB, Jr., residing at Chicago, in the county of Cook and State of Illinois, have invented certain new and useful Improvements in Electric Signaling Systems and Selective Mechanism Therefor, of which the following is a specification.

My invention relates to certain new and useful improvements in electric signaling systems and selective mechanism therefor, and it particularly has for its object to provide a system of the selective type in which the operative parts and circuits are so arranged and combined as to clearly, effectively and accurately serve their intended purposes, the arrangement of parts being such that any desired station of a number of stations may be selected from the "home" or central station and signaling with said station be had.

In the practical application of my invention, the same may be adapted for use in connection with block signaling for railways, or it may be used in connection with other signaling systems, if desired.

In its generic nature, my invention comprises a plurality of step-by-step circuit controllers to bring any desired station in circuit with the "home" or central station.

Again, my invention comprises an improved type of selective mechanism for use in selective systems which comprises a rotary contact making device and electro magnetically operable means for moving said rotary contact making device uni-directionally to control the signaling circuit.

With other objects in view than have been heretofore specified, the invention also comprises certain novel construction, combination and arrangement of parts, all of which will be first described in detail, and then be specifically pointed out in the appended claims, reference being had to the accompanying drawings, in which:—

Figure 1:
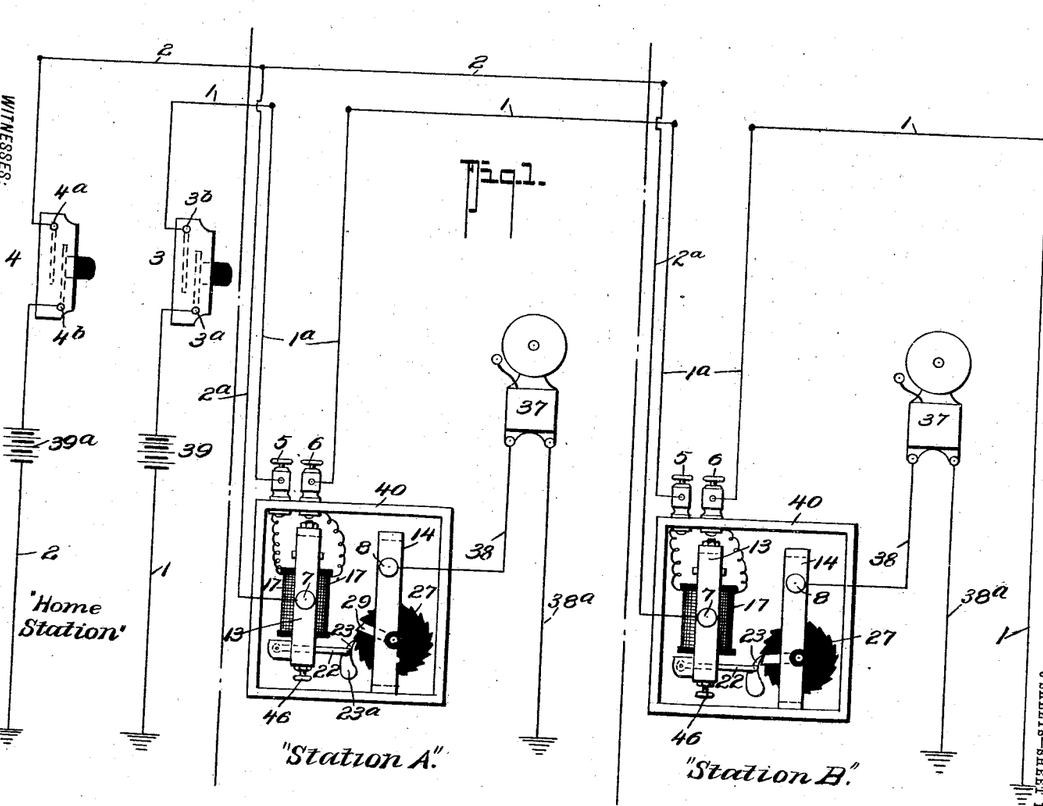
Figure 1, is a diagrammatic view, illustrating the arrangement of parts, the "home" or central station and two sub-stations being shown.

Referring now to the accompanying drawings in which like numerals and letters of reference indicate like parts in all of the figures, 1 denotes the line wire of the selecting circuit while the line wire of the signaling circuit is represented by the reference numeral 2 in the form of my invention shown diagrammatically in Fig. 1.

Each station ("home", station A, "station B") has its mechanism in electrical connection with the line wire 2 of the signaling circuit by branch wires $2^a$, as shown, the respective electro operative parts of the mechanism of each station that are controlled by the wires $2^a$, being connected in parallel with one another.

The selecting mechanism of each station has its selecting magnet 17 connected in series with the line wire 1, thus connecting all selecting magnets 17 on the line in series with the "home" station apparatus hereinafter referred to.

Since the operative mechanism at all sub-stations is the same, a detail description of one sub-station mechanism is thought will be sufficient.

Each sub-station mechanism comprises a housing or casing 40, preferably hermetically sealed, in which a rectangular frame 13 is mounted by screws 44, the frame 13, in practice, being preferably in the nature of a brass casting and forms what I shall hereinafter term the magnet supporting frame. The electro magnets 17 have their cores $17^a$ screwed to a cross bar $17^b$. which is in turn adjustably fastened to the upper bar $13^a$ of the frame 13 by a bolt 45 and nuts $45^a$. Near the lower end, the frame 13 is provided with a pair of laterally projecting lugs $13^b$ which receive the fulcrum screws 19, by means of which the armature 22 is pivoted in the frame 13.

Figure 2:
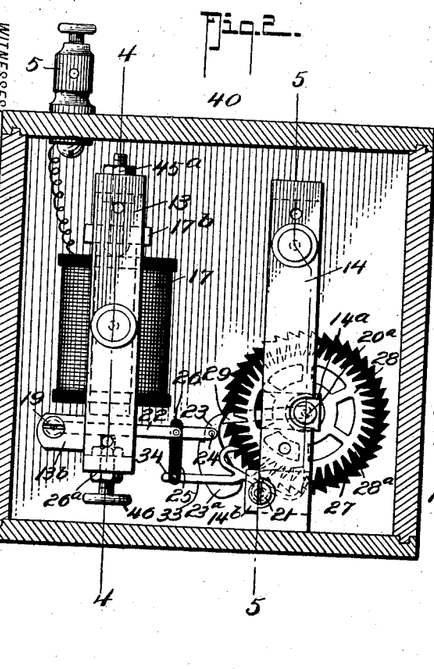
Fig. 2, is a front elevation of the selective mechanism, the housing therefor being shown in section.
Figure 3:
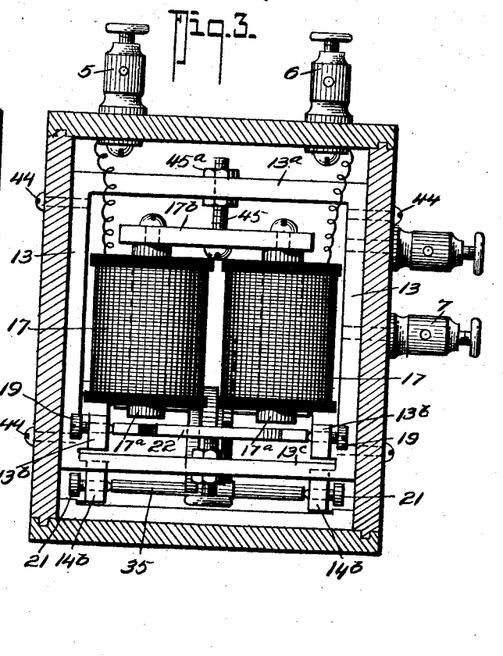
Fig. 3, is a side view of the parts shown in Fig. 2.
Figure 4:
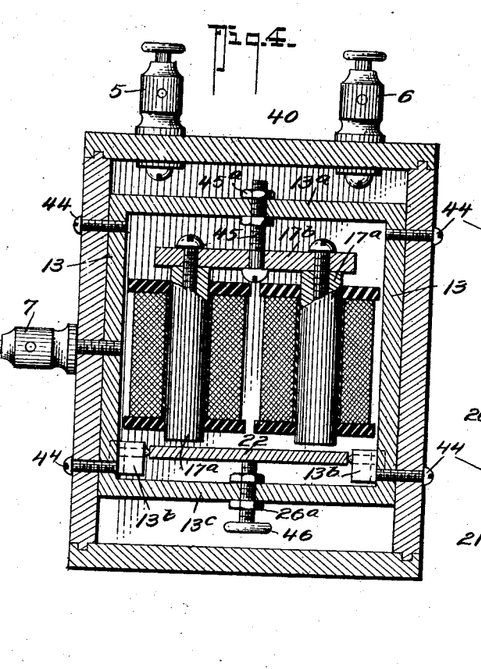
Fig. 4, is a cross section on the line 4—4 of Fig. 2.
Figure 5:
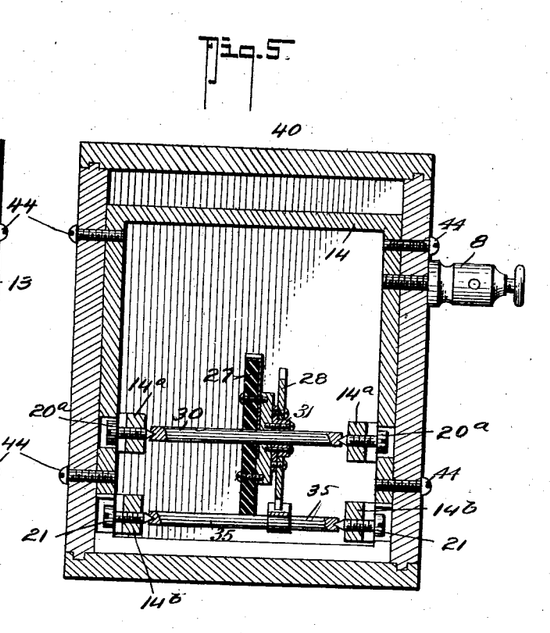
Fig. 5, is a cross section on the line 5—5 of Fig. 2.
Figures 6, 7, 8, 9, 11:
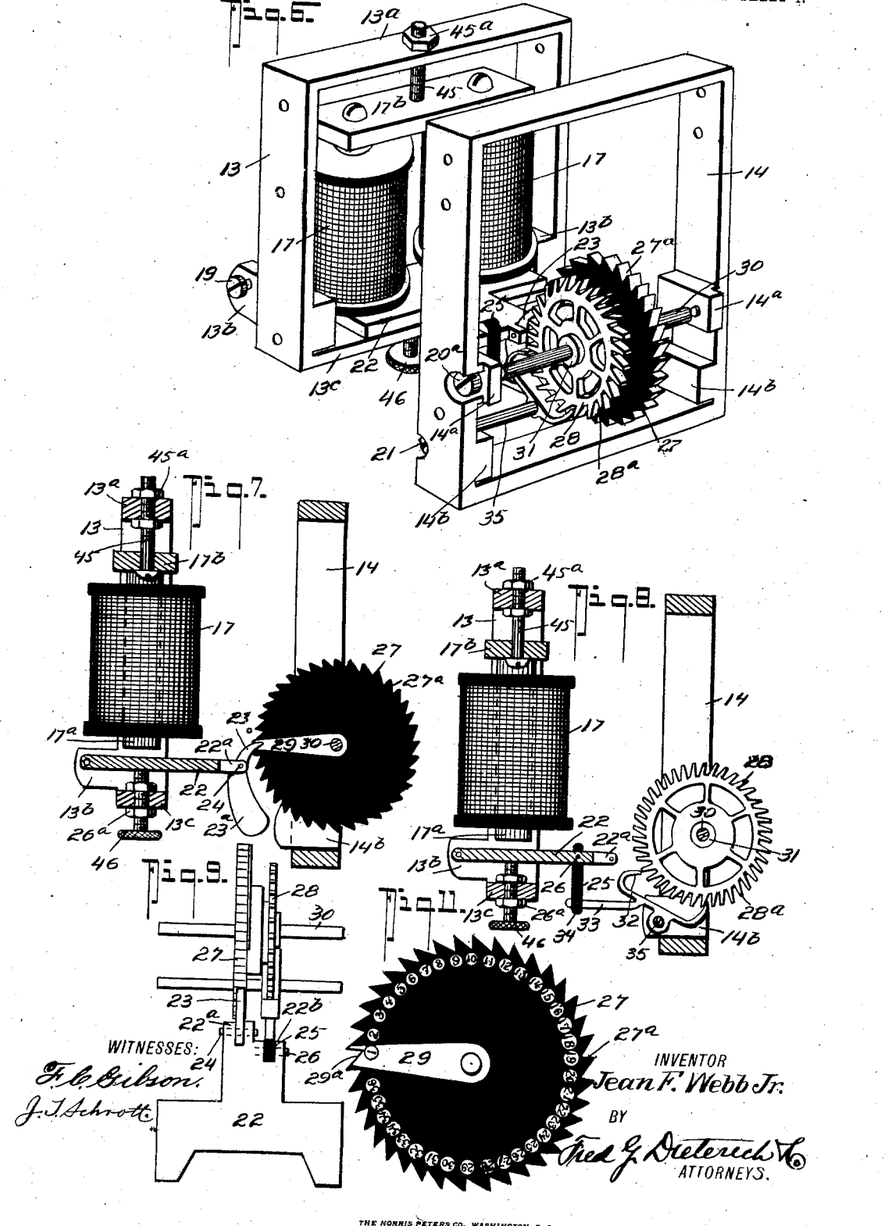
Fig. 6, is a perspective view of the selective mechanism, the casing being removed.
Fig. 7, is a detail vertical longitudinal section showing the selective parts without the escapement parts.
Fig. 8, is a similar view showing the escapement parts.
Fig. 9, is a top view showing the armature and the ratchet wheel together with the escapement wheel and their axle, and the escapement verge with its axle.
Fig. 11, is a detail view of the contact disk.

The armature 22 is provided with bearing portions $22^a$ and $22^b$ to respectively receive the metallic pawl 23 and the non-metallic pitman 25, the pawl 23 being fulcrumed on a pin 24 in the armature 22, and serving as a conductor while the pitman 25 is pivoted on a pin 26 in the armature and is constructed of fiber or other insulating material. The movement of the armature 22 is limited and adjusted by the set screw 46 and the check nuts $26^a$ in the lower bar $13^c$ of the frame 13. The terminal wires of the magnet 17 connect with binding posts 5 and 6 on the outside of the housing 40 to which the line wire 1 is electrically connected by leads $1^a$—$1^a$.

7 designates a binding post on the housing 40 which screws into the frame 13 and is connected to the wire $2^a$ of the signaling circuit.

14 designates another supporting frame of similar form to the frame 13, which I shall hereinafter term the wheel supporting frame. The wheel supporting frame 14 has lateral lugs 14ª to receive pivot screws 20ª, which pivotally support the axle 30 that carries the contact wheel 27 and the escapement wheel 28, the axle 30 having an enlargement 31 to enable the wheels 27 and 28 to be readily secured thereto. The frame 14 is secured in the housing by screws 44.

The contact wheel 27 is constructed of fiber or other insulating material, in practice, and is provided with a definite number of ratchet teeth 27ª to coöperate with the pawl 23, which has a weighted portion 23ª so that it will always be held in contact with the wheel 27. The wheel 27 is provided with a suitably arranged contact plate 29 terminating in a metallic cog or tooth 29ª (see Fig. 11) to act as a circuit closer, it being understood that the cogs 29ª on the wheels 27 of the different sub-station mechanisms are arranged to correspond to the number of sub-stations so that only one station will have its cog 29ª in contact with the pawl 23 at a time.

The escapement wheel 28 has teeth 28ª to correspond in number with those on the wheel 27. The verges 32 of the escapement wheels 28 are mounted on a shaft 35 which is fulcrumed on set screws 21 that are held in lugs 14ᵇ laterally projecting from the frame 14.

33 designates an actuating arm for the verges 32, which arm is fulcrumed at 34 to the pitman 25, the pitman 25 serving to insulate the armature 22 from the escapement mechanism.

A set screw 8 on the casing 40 passes into the frame 14 and is electrically connected by a wire 38 with the signal 37 which is in turn grounded through a wire 38ª, as indicated. The signal 37 may be any desired electrically controlled or operative mechanism, but for convenience of illustration I have shown such signal as being an ordinary electric bell, although I desire it understood that I do not limit myself to such type of signal.

At the "home" station I provide a normally open make and break circuit closer 4 whose contacts 4ᵇ and 4ª are respectively connected to the line wire 2 and a source of electrical energy 39ª, as indicated. A second normally open make and break circuit closer 3 being provided which has one of its terminals 3ᵇ connected to line wire 1 and the other terminal 3ª connected to a source of electrical energy 39, both sources of electrical energy 39 and 39ª having their other terminals grounded, as indicated.

The circuit closers 3 and 4 may be of any approved type and either automatic in their operation or otherwise, as the specific construction of such circuit closers form no part of my present invention, but for convenience of illustration I have shown such circuit closers as being of the ordinary type of "push button."

Operation. So far as described, the manner in which my invention operates, will be best explained as follows:—The operator desiring to call a particular station from the "home" office works the circuit closer 3 to close the circuit a definite number of times, depending upon the station to be called. When the circuit is closed by the circuit closer 3, the electrical circuit is made from ground through battery 39, make and break circuit closer 3, line wire 1, binding post 5, electro magnet 17, of station A, binding post 6 of station A, line wire 1, and from thence in a similar manner through all the stations on the line and grounded from the line wire 1 at the final station.

When it is desired to operate a signal at any particular station, the circuit just mentioned is closed and opened by the circuit closer 3 a sufficient number of times to bring the pawl 23 of the respective station desired in contact with the circuit closer 29 at that particular station. Each closing of the circuit by the circuit closer 3 sends electrical impulses over the line wire 1, which energizes the magnet 17 of all stations, thus attracting their armatures 22 upward; each raising of the armature 22 rotates the ratchet wheels 27, one cog, by reason of the engagement of the pawls 23 in the teeth of the ratchet wheels 27, likewise oscillates the verges 32 of the escapement wheels 28 so that the escapement wheels and the contact wheel 27 can turn only one cog at each raising of the armature. Each breaking of the circuit over the line wire 1, by the circuit closer 3 demagnetizes the electro magnet 17, thus permitting their armatures 22 to drop by gravity into their normal positions, the pawls 23 engaging the succeeding lower cogs of the wheels 27 (the upper end of the pawls making a contact against the face of the cogs by reason of the gravity of the heavier lower portion) and the verges 32 engaging the succeeding teeth of the wheels 28. When the wheels 27 have been rotated until the circuit closer 29 of the desired station is in contact with the pawl 23 at the particular station where the signal is to be given (see station B, Fig. 1) the signal is operated by closing the circuit on the line wire 2 through the medium of the make and break circuit closer 4. The signaling circuit includes a source of electrical energy 39ª, grounded at one side at the "home" office, and when the circuit closer 4 of the signaling circuit is closed, the current flows from the source of electrical energy 39ª through the line wire 2 and lead 2ª of the desired station into the supporting frame 13 of such station and from thence across the armature 22 and pawl 23 to the contact 29 of the wheel 27 and from thence through axle 30 and frame 14 to binding post 8 and through lead 38 to signal 37 and from signal 37 to ground lead 38ª, thus the actuating of the controlling mechanism or circuit closer 4 at the "home" office will actuate the bell or other signaling device 37 at the station desired. In place of the ground return, a metallic connection may be used, if desired, as is well known in the art, and hence illustration thereof is thought to be unnecessary.

Figure 10:
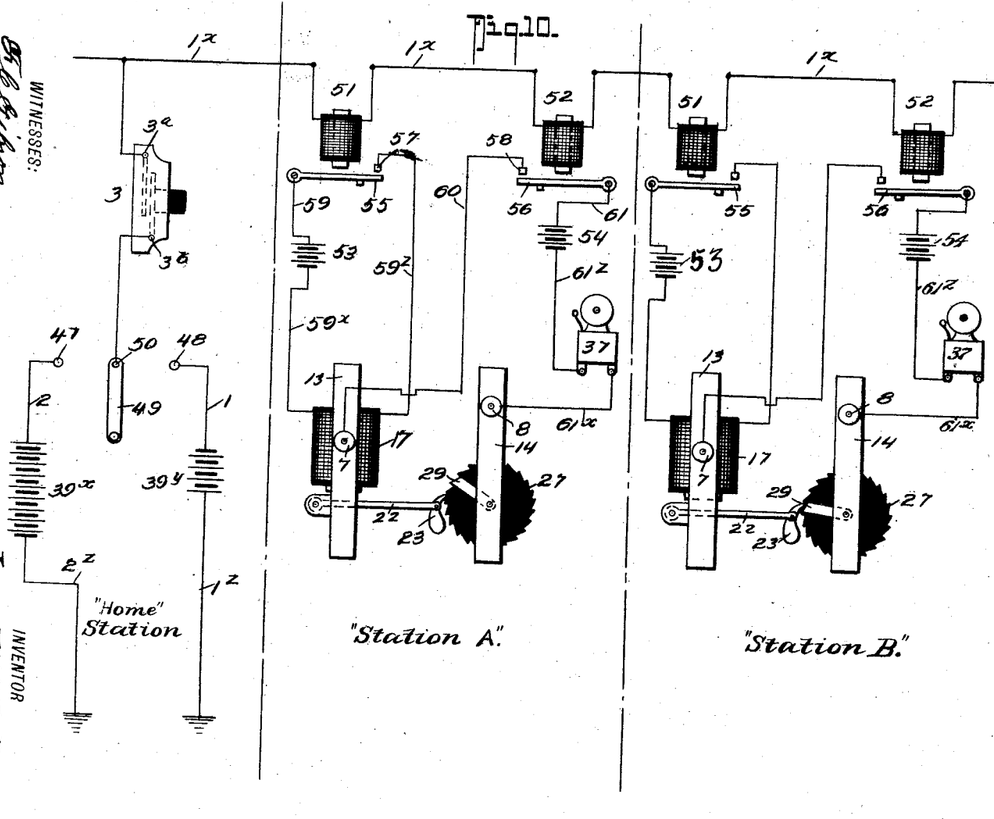
Fig. 10, is a diagrammatic view showing a modified arrangement of my system.

When the form of my system disclosed in Fig. 10 is used, it will be seen that I merge the signal wire 2 and the selecting line wire 1 into a single wire 1ˣ which connects with a circuit closer 3 having the contacts 3ᵇ and 3ª of the same type as that shown in Fig. 1 of the drawings. The circuit controller 3 at the "home" station also connects with the fulcrum point 50 of a switch lever 49 that coöperates with contacts 47 and 48, which connect respectively through wires 2ᶻ and 1ᶻ with sources of electrical energy 39ˣ and 39ʸ, which sources of electrical energy have their other terminals grounded, as indicated.

At each sub-station I provide relays 51 and 52 connected in series with the line wire 1ˣ, the line wire 1ˣ of the final station is grounded as before.

The object of the method of wiring disclosed in Fig. 10 is to eliminate the use of one wire and handle the whole system on a single line, which is probably the way it would be done commercially.

There are two ways in which the method of wiring disclosed in Fig. 10 may be used, first, by changing the direction of the current flowing over the line wire $1^x$, so that when source of electrical energy $39^y$ is used, the relays are polarized with say, a positive pole toward the armatures, and when source of electrical energy $39^x$ is used the relays are polarized with say, negative pole toward the armatures. In this case, the armatures 55 of the relays 51 must be permanently polarized so that they are attracted when source $39^y$ is used, but repelled when source $39^x$ is used, while the armatures 56 of the relays 52 must be permanently polarized so that they are attracted when source $39^x$ is used but repelled when source $39^y$ is used, it being understood that the sources of electrical energy $39^x$—$39^y$ are arranged to send a current impulse over the line wire $1^x$ in opposite directions. The second way in which the method of wiring shown in Fig. 10 may be used, is as follows:—By sending out a weak current from source of electrical energy $39^y$ and a strong current from source $39^x$, and in this case the magnets of the relays 51 must be wound so that they will act with a weak current while the magnets of the relays 52 must be wound so that they will act only with a strong current.

In Fig. 10 the reference numeral $39^x$ designates a source of negative electrical energy (or strong electrical energy as the case may be) while $39^y$ indicates a source of positive electrical energy or weak electrical energy, as the case may be.

51 designates a polarized relay operable only with positive current (or with weak current, as the case may be) while the relay 52 operates with a negative current (or with a strong current, as the case may be).

53 designates a source of local electrical energy controlled by the relay 51 and 54 designates a similar source of electrical energy controlled by the relay 52.

The polarized armatures 55 of the relay 51 are connected through leads 59 with the source of electrical energy 53, which is in turn connected through a lead $59^x$ with the magnet 17 of the selecting and signaling controlling mechanism of the respective stations. The other terminal of the magnet 17 connects through a lead $59^z$ with the contact point 57 that coöperates with the armatures 55 to close the local circuit when the relay 51 is operated.

The source of electrical energy 54 connects through a lead 61 with the armature 56 of the relay 52, which coöperates with a fixed contact point 58 that connects through a lead 60 with the binding post 7 of the selective mechanism. The binding post 8 of the selective mechanism as before, connects through a lead $61^z$ with the signal 37, which in turn connects through a lead $61^x$, with the battery or local source of electrical energy 54, thus completing the local signaling circuit.

In the form of my invention shown in Fig. 10, the operation is as follows: The switch 49 is moved to connect contact points 48 and 50. The make and break circuit closer 3 is operated to send a sufficient number of impulses over line wire $1^x$ to bring pawls 23 in contact with circuit closer 29 of the desired station (station B). With each closing of the circuit at closer 3, the impulses affect the relays so that only armatures 55 of relays 51 are attracted. Each attraction of the armatures 55 causes it to touch contact point 57 and thus close the local selecting circuit, which energizes the magnet 17 and moves the wheels 27 one cog forward.

When the pawl 23 is in contact with the circuit closer 29 at the station where the signal is to be given, the switch 49 is moved to connect contact points 47 and 50 and the closing of the circuit by the circuit closer 3 sends an impulse over line wire $1^x$ which affects the armatures of the relays 52 only. The attraction of the armatures 56 causes them to touch contact points 58, and thus close the local signaling circuit, which operates the signaling devices 37 at that station where the pawl 23 is in contact with the circuit closer 29, since the local signaling circuit is open at the other stations, by reason of the pawls 23 and the contact 29 thereof being out of contact with one another.

Figure 12:
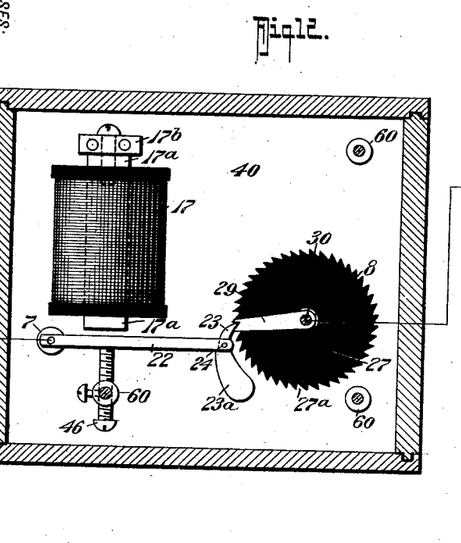
Figs. 12 and 13 are detail views of a modification of my invention.
Figure 13:
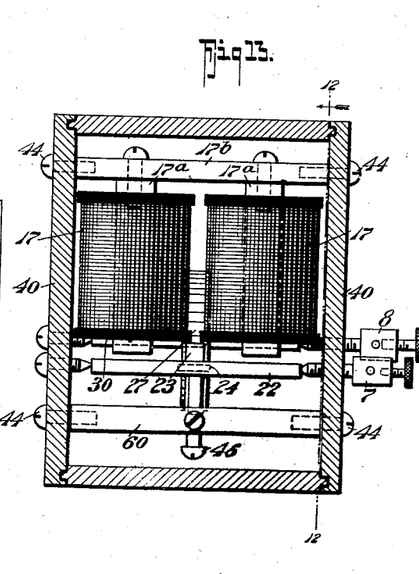

In Figs. 12 and 13 I have shown a modified form of my invention in which the frames 13 and 14 are dispensed with and the housing is made to serve the supporting function of such frames. In this case the housing 40 may be made of fiber, rubber or wood, and spacing rods 60 may be provided between the side walls of the housing wherever desirable. In these figures I have shown only the most essential parts of my apparatus.

In the practical application of my invention I propose to have an indicating mechanism at the "home" office, of any suitable type to indicate which station is in connection with the "home" office at any time, but since this mechanism forms no part of my present invention, but will form the subject matter of a later application, I do not deem it necessary to illustrate or describe the same at this time, since the system is perfectly operable by the mechanism shown and described herein, as being present in the "home" office.

The essential features of my selective mechanism, I desire it understood, reside in the provision of the unidirectionally rotatable circuit closing disk 27 operable directly by the armature of the electro magnet 17, together with the escapement wheel and verge directly controlled by the armature of the electro magnet 17.

From the foregoing description taken in connection with the accompanying drawings, it is thought the complete construction, operation and numerous advantages of my present invention will be readily understood by those skilled in the art to which it appertains, and I desire to say that many slight changes in the detailed construction, operation and arrangement of parts may be made without departing from the spirit of my invention or the scope of the appended claims.

What I claim is:—

1. A selective signaling system, comprising in combination a main station and a plurality of substations, a selecting circuit and a signaling circuit common to all of said stations, means at the main station in each of said circuits for sending electrical impulses through the respective circuits at times, selecting mechanism and signal mechanism at the substations, each of said selective mechanism comprising a rotatable shaft, a contact disk carried thereby, operating magnets electrically connected in the selecting circuit, and armature for said magnets, means for imparting step-by-step movement to said contact disk, and an escapement device comprising an escapement wheel carried by said rotatable shaft, an escapement verge pivotally mounted for coöperation with said escapement wheel and coöperatively connected with said armature, said armature and said disk contact and said signal being in the signaling circuit.

2. In a selective signaling system, a main station and a plurality of substations, an electric circuit common to all of said stations, a step-by-step indicator mechanism for each of said substations, said indicator mechanism comprising operating magnets in electrical connection with the common circuit, armatures for said magnets, a rotatable contact carrying ratchet disk, a pawl carried by said armature for engaging said disk, escapement means connecting the armature with the ratchet disk, means for insulating the connection between the armature and the escapement devices, a signal in circuit with the disk contact, and means at the main station for sending impulses through the common circuit to operate the operating magnets and the signal, substantially as shown and described.

3. In a selective signaling system, a main station and substations, a main line wire common to all of said stations, a make and break circuit controlling device in the home station connected with the line wire, a switch connected with said make and break circuit controlling device, a pair of independent sources of electrical energy connected with said switch, a pair of relays for each station in circuit with the line wire and operable respectively by current from the respective sources of electrical energy at the home station, a step-by-step selective mechanism including operating magnets in circuit with one of said relays, and including step-by-step contact devices in circuit with the other relay, and an electric signal in circuit with said other relay, substantially as shown and described.

4. A step-by-step circuit controlling mechanism, comprising in combination a magnet supporting frame, operating magnets adjustable in said frame, an armature pivotally mounted in said frame, means for adjusting and limiting the movement of said armature, a wheel carrying frame, a shaft rotatably mounted in said wheel carrying frame, a contact carrying disk having ratchet teeth mounted on said shaft, an escapement wheel also mounted on said shaft, a pawl carried by said armature for engaging said contact carrying disk, an escapement verge pivotally supported on said wheel carrying frame, and insulating connections between said armature and said verge, substantially as shown and described.

5. In a selective signaling system, an operating circuit and a signaling circuit, sources of electrical energy for said circuits, make and break circuit closers, and a step-by-step circuit controlling mechanism electrically connected in both of said circuits and comprising in combination a magnet supporting frame, operating magnets adjustably held in said frame, an armature pivotally mounted in said frame, means for adjusting and limiting the movement of said armature, a wheel carrying frame, a shaft rotatably mounted in said wheel carrying frame, a contact carrying disk having ratchet teeth mounted on said shaft, an escapement wheel mounted on said shaft, a pawl carried by said armature for engaging said contact carrying disk, an escapement verge pivotally supported on said wheel carrying frame, insulating connections between said armature and said verge, said operating magnets electrically connected in the operating circuit, and said magnets carrying frame and said wheel carrying frame electrically connected in the signaling circuit, substantially as shown and described.

6. A step-by-step circuit controlling mechanism, comprising in combination a magnet supporting frame, operating magnets adjustably supported in said frame, an armature pivotally mounted in said frame, means for adjusting and limiting the movement of said armature, a wheel carrying frame, a shaft rotatably mounted in said wheel carrying frame, a contact carrying disk having ratchet teeth mounted on said shaft, an escapement wheel also mounted on said shaft, a pawl carried by said armature, for engaging said contact carrying disk, an escapement verge pivotally supported on said wheel carrying frame, insulating connections between said armature and said verge, and a housing for the whole, means for supporting said frames in said housing, substantially as shown and described.

7. The combination with a housing, a magnet carrying frame rigidly held therein, and a wheel carrying frame rigidly held therein, operating magnets adjustably suspended in said magnet carrying frame, said magnet carrying frame having bracket portions, an armature fulcrum in said frame between said bracket portions, means beneath said armature for limiting the movement thereof and adjusting the same, said armature having a pair of bearings, a pawl pivotally mounted in one of said bearings, an insulating member pivotally mounted in the other bearing, said wheel carrying frame having lugs, a wheel shaft fulcrumed between said lugs, an insulating contact carrying ratchet disk on said last named shaft, an escapement wheel likewise mounted on said last named shaft, said armature pawl adapted to engage with said insulating shaft carrying disk, said wheel carrying frame having supplemental lugs, a supplemental shaft mounted between said lugs, an escapement verge carried by said supplemental shaft and coöperating with the escapement wheel, and pivotal connections between said insulating armature member and said verge, substantially as shown and described.

8. The combination with a housing, a magnet carrying frame rigidly held therein, and a wheel carrying frame rigidly held therein, operating magnets adjustably suspended in said magnet carrying frame, said magnet carrying frame having bracket portions, an armature fulcrumed in said frame between said bracket portions, means beneath said armature for limiting the movement thereof, and adjusting the same, said armature having a pair of bearings, a pawl pivotally mounted in one of said bearings, an insulating member pivotally mounted in the other bearing, said wheel carrying frame having lugs, a wheel shaft fulcrumed between said lugs, an insulating contact carrying ratchet disk on said last named shaft, an escapement wheel likewise on said last named shaft, said armature pawl adapted to engage with said insulating shaft carrying disk, said wheel carrying frame having supplemental lugs, a supplemental shaft mounted between said lugs, an escapement verge carried by said suplemental shaft to coöperate with the escapement wheel, pivotal connections between said insulating armature member and said verge and means for energizing said magnets intermittently to move said contact carrying disk in one direction, substantially as shown and described.

9. The combination with a housing, a magnet carrying frame rigidly held therein, and a wheel carrying frame rigidly held therein, operating magnets adjustably suspended in said magnet carrying frame, said magnet carrying frame having bracket portions, an armature fulcrumed in said frame between said bracket portions, means beneath said armature for limiting the movement thereof, and adjusting the same, said armature having a pair of bearings, a pawl pivotally mounted in one of said pair of bearings, an insulating member pivotally mounted in the other bearing, said wheel carrying frame having lugs, a wheel shaft fulcrumed between said lugs, an insulating contact carrying ratchet disk on said last named shaft, an escapement wheel likewise on said last named shaft, said armature pawl adapted to engage with said insulating shaft carrying disk, said wheel carrying frame having supplemental lugs, a supplemental shaft mounted between said lugs, an escapement verge carried by said supplemental shaft and coöperating with the escapement wheel, pivotal connections between said insulating armature member and said verge, means for energizing said magnets intermittently to move said contact carrying disk in one direction, and a signaling circuit including said frame, closable by the armature pawl and the disk carrying member, substantially as shown and described.

10. A step by step circuit controlling mechanism, comprising in combination, a suitable supporting frame, an electro magnet, an oscillating armature, a uni-directionally rotatable circuit closer carrier, a pawl pivotally mounted on said armature and intermittently engaging with said carrier, and an escapement wheel rotating synchronously with said carrier, and an escapement verge coöperating therewith and means coöperatively connecting the escapement verge with the armature to be operated thereby at each impulse thereof.

11. A step by step circuit controlling mechanism, comprising in combination, a suitable supporting frame, an electro magnet, an oscillating armature, a uni-directionally rotatable circuit closer carrier, a pawl pivotally mounted on said armature and intermittently engaging with said carrier, an escapement wheel rotating synchronously with said carrier, an escapement verge coöperating therewith, and means for intermittently oscillating the said verge by the movement of said armature.

12. A step by step circuit controlling device comprising in combination with a suitable supporting frame, an electro magnet, an oscillating armature therefor, a uni-directionally rotatable circuit closer having a contact portion, a pawl pivotally mounted on said armature and engaging said circuit closer and arranged to engage the contact thereof, once in each revolution of the rotatable circuit closer, an escapement wheel rotating synchronously with said rotatable circuit closer, and an escapement verge coöperating with said escapement wheel, an insulating connection between the escapement verge and the armature for imparting the armature motion to the escapement verge to oscillate the same, substantially as shown and described.

13. The combination with an intermittently energized electro magnet, and an armature therefor, of a rotatable shaft, a contact carrying disk mounted on said shaft, a contact pawl carried by the armature for engaging said contact carrying disk, an escapement wheel mounted on said rotatable shaft to turn with the contact carrier, an escapement verge coöperating with said escapement wheel, an insulating member pivotally connecting the escapement verge with the armature, and said armature carried pawl being electrically connected, said rotatable shaft and the contact of the contact carrier being electrically connected, and means for electrically connecting the terminals of an electric circuit to the armature and the rotatable shaft respectively, substantially as shown and described.

JEAN F. WEBB, Jr.

Witnesses:
 E. W. POWELL,
 JOHN R. CLISBY.